United States Patent [19]
Brinkmann et al.

[11] 3,961,966
[45] June 8, 1976

[54] CYANOACRYLATE ADHESIVES

[75] Inventors: Bernd Brinkmann, Bad Zwischenahn; Wolfgang Imoehl, Unna, both of Germany

[73] Assignee: Schering Aktiengesellschaft, Berlin and Bergkamen, Germany

[22] Filed: Sept. 27, 1974

[21] Appl. No.: 509,827

[30] Foreign Application Priority Data
Oct. 4, 1973 Germany............................ 2349799

[52] U.S. Cl............................... 106/36; 106/287 R; 106/311; 260/343.5; 260/343.6; 260/343.9; 260/465.4
[51] Int. Cl.[2]............... C07C 121/38; C07D 305/10; C09J 3/00; C09K 3/14
[58] Field of Search........... 260/465.4, 343.5, 343.6, 260/343.9; 106/287 R, 311, 36

[56] References Cited
UNITED STATES PATENTS

| | | | |
|---|---|---|---|
| 2,467,927 | 4/1949 | Ardrs............................ | 260/465.4 |
| 2,585,537 | 2/1952 | Coffman...................... | 260/46504 |
| 3,155,685 | 11/1964 | Prill et al. ....................... | 260/465.4 |
| 3,527,841 | 9/1970 | Wicker et al. ................. | 260/465.4 |
| 3,759,264 | 9/1973 | Coover et al. ................. | 260/46504 |

Primary Examiner—Joan E. Welcome
Attorney, Agent, or Firm—Curtis, Morris & Safford

[57] ABSTRACT

Adhesive compositions comprising an ester of α-cyanacrylic acid of the formula

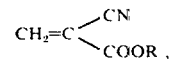

plasticized by the presence therein of a lactone such as γ-butyrolactone, ε-caprolactone, or cumarin.

6 Claims, No Drawings

CYANOACRYLATE ADHESIVES

The present invention relates to adhesive compositions comprising esters of α-cyanacrylic acid of the general formula

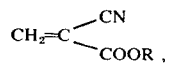

wherein R is hydrocarbon having 1 to 10 carbon atoms, in admixture with a lactone.

Cyanacrylic acid esters are very rapidly-hardening adhesives which polymerize by an anionic mechanism which can be triggered by very small traces of Lewis bases, such as moisture, for example. In order to prevent a premature polymerization during storage, certain acid substances, such as sulfur dioxide, are generally added to the adhesive. It is further recommended that substances which inhibit free radical polymerization also be added.

For certain end uses, the products can be used as adhesives without any further formulation. For other uses, the resultant adhesive compounds are often too brittle, so that the addition of plasticizers is required. Further, in certain cases certain polymers may be added to the adhesives as thickening agents so that a satisfactory adhesive bond can be formed even when the parts being joined are insufficiently well-fitting.

As plasticizers, phthalates, triaryl- or trialkylphosphates, sebacic acid esters and succinic acid esters have been employed. Since these substances do not participate in the hardening polymerization, they generally bring about a noticeable retardation of the rate of setting or curing proportional to their concentration in the adhesive mixture. This side effect is undesired since the advantage of the cyanacrylate adhesives lies just in their unusually rapid rate of hardening.

Surprisingly, it has now been found that certain lactones can be added as plasticizers to cyanacrylic acid esters without a substantial worsening of the setting rate, if they are in particular concentrations. In some cases, even a clear improvement of the setting rate is observed. This is particularly desirable in adhesive mixtures which have lost a part of their original activity as a result of long storage.

It has further been found that certain bi-cyclic lactones, in comparison with mono-cyclic lactones, also effect an improvement of the resistance to heat of the adhesive joints made with adhesives containing these lactones.

The lactones which are to be added according to the present invention are mono-cyclic or bi-cyclic lactones having from 4 – 7 members in the lactone ring. They may be saturated or unsaturated and may optionally be substituted with alkyl-, aryl-, benzo-, cycloalkyl-, or carboxyester-groups. The lactones used according to the invention can have from 3 to 20, preferably from 3 to 10, carbon atoms therein. One group of these lactones can be represented by the following general formula

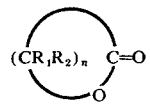

wherein $R_1$ and $R_2$ may be the same or different and are hydrogen or alkyl and $n$ is an integer from 2 to 5 inclusive.

The lactones present in the mixtures according to the present invention can, for example, by any of the following compounds:

a. a four-membered β-lactone such as

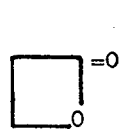 or 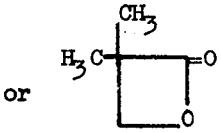

(propiolactone)     (pivalolactone)

b. a five-membered γ-lactone such as

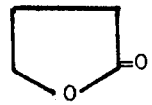

(butyrolactone)

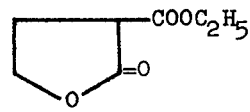

(3-carbethoxy-γ-butyrolactone)

(5-ethyl-γ-butyrolactone)

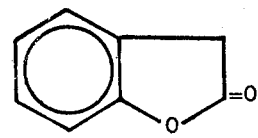

(phthalid)

c. a six-membered δ-lactone such as

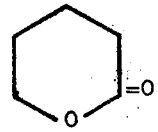

(δ-valerolactone)

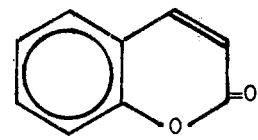

(cumarin)

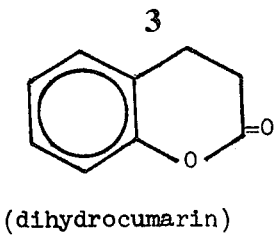

(dihydrocumarin)

d. a seven-membered ε-lactone such as

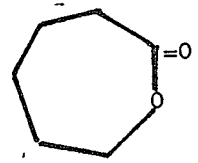

(ε-caprolactone)

As exemplary of bi-cyclic lactones,

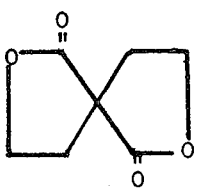

(heptodilactone)

and

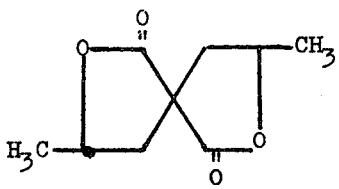

(dimethylheptodilactone)

can be mentioned.

The lactones according to the present invention may be added alone or in admixture in amounts up to 50 percent by weight of the adhesive mixture, preferably from 5 to 50 percent. The optimum addition is from about 10 to 30 weight percent of the final product.

In preferred embodiments of the invention, the lactone present in the compositions is γ-butyro lactone, ε-caprolactone, cumarin, or a bi-cyclic lactone.

The esters of the cyanacrylic acids which form the basis of the composition can be prepared in a known fashion, for example according to U.S. Pat. No. 2,467,927. According to this process, the corresponding esters of cyanacetic acid are reacted with formaldehyde in the presence of basic catalysts to form polymeric condensation products. After removal of the water of reaction and the solvent, the condensation product is combined with phosphorus pentoxide in the presence of a free radical stabilizer. The monomer distilled off at reduced pressure is combined with stabilizers for inhibiting anionic as well as free radical polymerization. [For example $SO_2$ (0.003 percent), hydroquinone (0.01 percent), sulfonic acids, etc.]

As earlier disclosed, hydrocarbon esters of α-cyanacrylic esters can be used to prepare the adhesive mixtures according to the present invention. Preferred materials are lower aliphatic hydrocarbon esters, such as the methyl, ethyl, butyl, isobutyl, and allyl esters of cyanacrylic acid. The pentyl-, heptyl-, lauryl-, and phenyl-esters of cyanacrylic acid can also be mentioned. These adhesives can contain other plasticizers in addition to the aforementioned lactones, as well as film-forming agents and thickeners.

A better understanding of the present invention and of its many advantages will be had by referring to the following specific examples, given by way of illustration.

The lactones reported in following Tables I – IV are, in general, commercially available. For those materials which are not readily available, a literature reference concerning their preparation has been cited. Before the lactones are used, a distillation over isocyanate is desirable in order to remove any hydroxy groups which might have a destabilizing effect.

In the Tables, the curing time is defined as that time after which an adhesive bond can only be broken with destruction of the substrate. The reported tensile shear values were determined on etched aluminum sheets according to DIN 53 283.

The curing times were determined using "Nora-Test" rubber as a base. The material is a test rubber produced by the firm of Karl Freudenberg, Weinheim, Germany.

TABLE I

Mixtures of Lactones with α-Cyanacrylic Acid Methyl Ester and Comparison Tests

| Lactone | Amount (Weight Percent) | Tensile Shear ($Kg/mm^2$) | Curing Time (Sec.) |
|---|---|---|---|
| Propiolactone | 10 | — | 2 |
| Butyrolactone | 10 | 2.0 | 3 |
| | 20 | 2.1 | 3 |
| | 30 | 1.1 | 12 |
| Pivalolactone | 10 | 2.0 | 10 |
| | 20 | 1.9 | 10 |
| | 30 | 0.9 | 60 |
| γ-Caprolactone* | 10 | 2.1 | 6 |
| | 20 | 1.8 | 17 |
| | 30 | 0.8 | 21 |
| Carbethoxy-butyrolactone+ | 10 | 2.0 | 5 |
| | 20 | 2.0 | 4 |
| Phthalide | 10 | 2.0 | 10 |
| | 20 | 1.8 | 30 |
| | 30 | 1.4 | 45 |
| Cumarin | 10 | 2.3 | 2–3 |
| | 20 | 2.3 | 4 |
| | 30 | 2.0 | 5–6 |
| ε-Caprolactone | 10 | 2.0 | 4 |
| | 20 | 1.9 | 5 |
| | 30 | 1.7 | 7 |
| No additive | — | 2.0 | 8 |
| Sebacic acid-dimethylester | 10 | 1.6 | >60 |
| | 20 | 1.5 | >60 |
| | 30 | 0.9 | >60 |
| Dioctyl-phthalate | 10 | 1.9 | >60 |
| | 20 | 0.7 | >60 |
| | 30 | 0.2 | >60 |

*Burton, Ingold Soc. 1929, 2036
+Michael, J. Amer. Chem. Soc. 56, 2012 (1934)

TABLE II

Mixtures of α-Cyanacrylic Acid Methyl Ester and Butyrolactone

| Amount of Butyrolactone (Weight Percent) | Curing Time (Sec.) | Curing Time after 3 Months Storage (Sec.) |
|---|---|---|
| 0 | 8 | 15 |
| 10 | 3 | 8 |
| 15 | 3 | 8 |

TABLE II-continued

Mixtures of α-Cyanacrylic Acid Methyl Ester and Butyrolactone

| Amount of Butyrolactone (Weight Percent) | Curing Time (Sec.) | Curing Time after 3 Months Storage (Sec.) |
|---|---|---|
| 17 | 3 | 8 |
| 20 | 3 | 8 |
| 22 | 5 | 8 |
| 24 | 5 | 8 |
| 25 | 6 | 8 |
| 30 | 12 | 60 |

TABLE III

Effect of Dilactones on the Resistance of α-Cyanacrylic Acid Methyl Ester Adhesive Bonds to Heat

| Lactone | Amount (Weight Percent) | Curing Time (Sec.) | Tensile Shear Value ($Kg/mm^2$) | | |
|---|---|---|---|---|---|
| | | | R.T. | 100°C | 120°C |
| Butyrolactone | 20 | 3 | 180 | 30 | 14 |
| Heptodilactone* | 20 | 13 | 130 | 60 | 40 |
| Dimethylhepto-dilactone* | 15 | 4 | 180 | 160 | 60 |

*Bennet, I. Chem. Soc. 127, 1277–88 (1925)

TABLE IV

Mixtures of Butyrolactone with Other α-Cyanacrylic Acid Esters

| Ester | Amount of Butyrolactone (Weight Percent) | Curing Time (Sec.) |
|---|---|---|
| Ethyl | 0 | 20 |
| Ethyl | 20 | 30 |
| Butyl | 0 | 25 |
| Butyl | 20 | 30 |

What is claimed is:

1. An adhesive composition comprising an ester of α-cyanacrylic acid of the formula

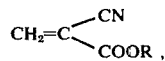

wherein R is hydrocarbon having 1 to 10 carbon atoms, plasticized by the presence in said composition of 5 to 50 percent by weight of a monocyclic or bi-cyclic lactone having from 3 to 20 carbon atoms and having from 4 to 7 members in the lactone ring.

2. An adhesive composition as in claim 1 wherein said lactone is present in an amount between 10 and 30 percent by weight.

3. An adhesive composition as in claim 1 wherein said lactone has the formula

wherein $R_1$ and $R_2$ are the same or different and are hydrogen or alkyl, and $n$ is an integer from 2 to 5 inclusive.

4. An adhesive composition as in claim 1 wherein said lactone is selected from the group consisting of γ-butyrolactone, ε-caprolactone, and cumarin.

5. An adhesive composition as in claim 1 wherein said lactone is a bi-cyclic lactone.

6. An adhesive composition as in claim 5 wherein said bi-cyclic lactone is heptodilactone or dimethylheptodilactone.

* * * * *